March 11, 1924. 1,486,279
T. T. BURCHELL
AUTOMATIC HOSE COUPLING
Filed April 7, 1920    2 Sheets-Sheet 1
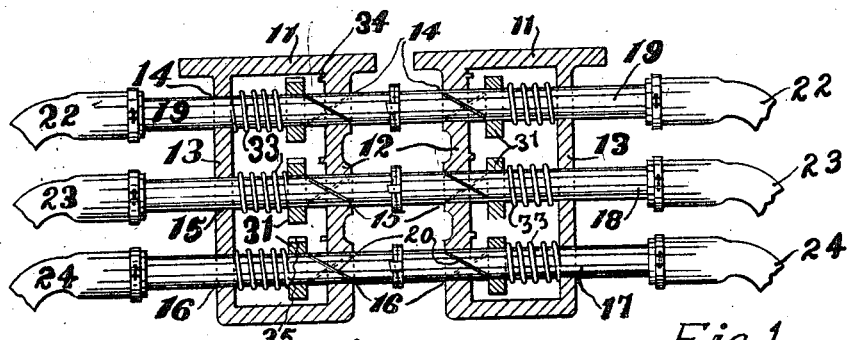
Fig. 1
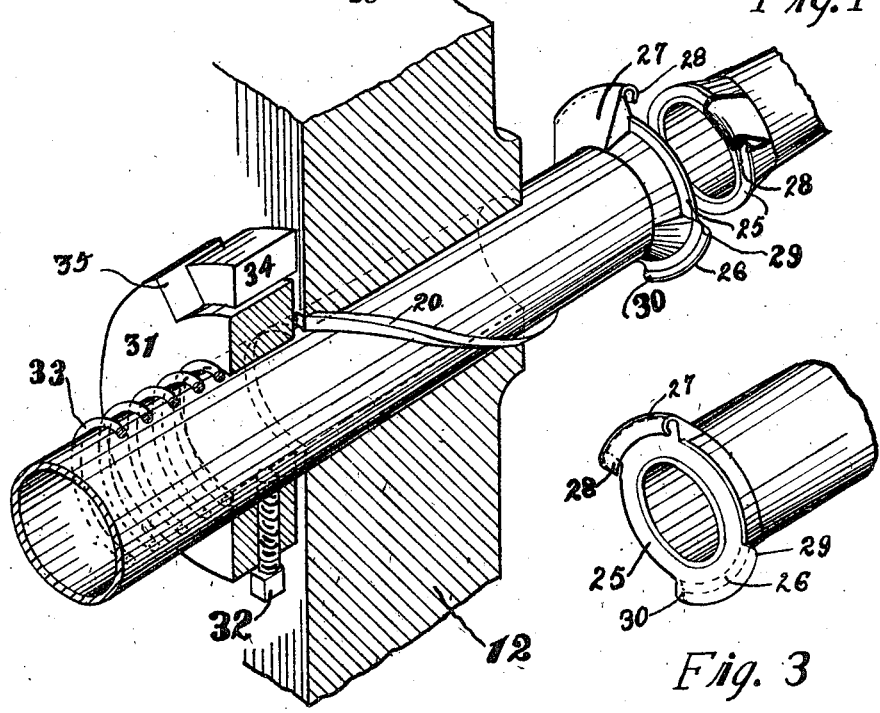
Fig. 2
Fig. 3
Theophilus T. Burchell
INVENTOR.
BY
J. E. Shannon
ATTORNEY.

March 11, 1924.

T. T. BURCHELL 1,486,279

AUTOMATIC HOSE COUPLING

Filed April 7, 1920    2 Sheets-Sheet 2

Theophilus T. Burchell
INVENTOR.

BY
J. E. Shannon
ATTORNEY.

Patented Mar. 11, 1924.

1,486,279

UNITED STATES PATENT OFFICE.

THEOPHILUS T. BURCHELL, OF AKRON, OHIO.

AUTOMATIC HOSE COUPLING.

Application filed April 7, 1920. Serial No. 371,937.

*To all whom it may concern:*

Be it known that I, THEOPHILUS T. BURCHELL, a citizen of the United States, residing at Akron, in the county of Summit and State of Ohio, have invented new and useful Improvements in Automatic Hose Couplings, of which the following is a specification.

This invention relates to a new and improved pipe coupling and has particular reference to a coupling designed to be used in connection with steam and air lines on trains.

One of the objects of the invention is to provide a means whereby the steam and air lines on one car may be automatically coupled to the lines of an adjoining car so as to entirely eliminate the dangers necessarily incident to the ordinary manner of coupling such lines together.

Another object is to provide a coupling device which will be of simple, substantial construction and which will form a tight rigid juncture between said lines.

A still further object is to provide a coupling whereby an even liquid pressure may be maintained in said lines and which will not in use become loosened by the sway of the cars and which is so constructed that the ends of pipes will be held in air tight abutment as long as the cars are coupled together.

An additional object is to provide a coupling means which will accomplish the above objects and will automatically release the ends of the pipes when the cars are uncoupled.

Another object is to provide a means whereby the ends of said pipes may be automatically closed if desired. This object being particularly directed to the steam lines on a train so that when a car is uncoupled from a train the ends of the steam line will be automatically closed, thus preventing the escape of steam from the pipes or radiators.

I accomplish the above and additional objects by the novel construction, combination and arrangement of parts hereinafter described and illustrated in the accompanying drawings which form a part hereof and wherein I have shown a preferred embodiment of the invention, it being understood that the invention is capable of various adaptations and that changes and variations may be made or substitutions resorted to which come within the spirit of the invention or the claim hereunto appended.

In the drawings in which I have employed similar numerals of reference to indicate corresponding parts throughout the several views, Figure 1 is a side elevation of the ends of a train pipe showing the same arranged in an operative position and showing in cross section the supporting structure.

Figure 2 is an enlarged fragmentary perspective view of a portion of a device constructed in accordance with this invention showing the same partly in cross section to more clearly illustrate the invention.

Figure 3 is a perspective view of the end portion of one of the pipes.

Figure 4:
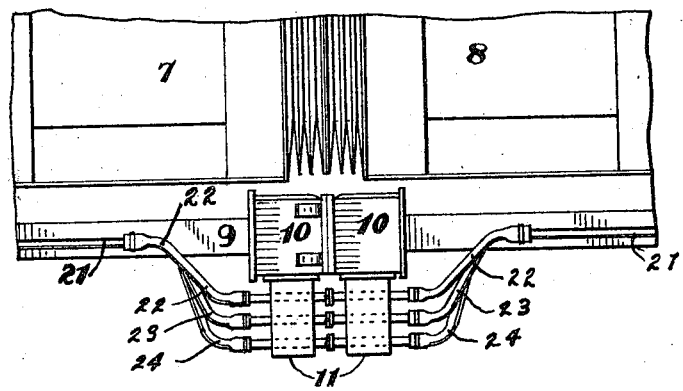
Figure 4 is a side elevation of an embodiment of my invention showing the manner in which it is applied to a train.
Figure 5:
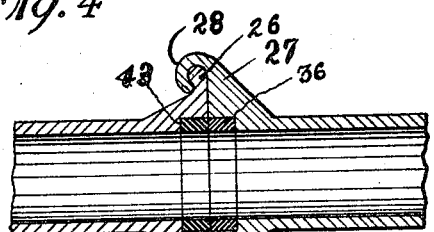
Figure 5 is a longitudinal sectional view of the ends of two pipes showing the same in coupled relation.

Referring now to the drawings in detail, the numeral 7 is used to indicate the end portion of a railroad coach which is coupled to another coach 8. Inasmuch as the coupling members are identical and are similarly positioned on each end of each coach, similar numerals of reference are employed. The coupling consists of a beam 9 to the free end of which is attached a suitable car coupling 10. A supporting frame 11 is rigidly fixed to the under side of each coupling 10. This frame 11 comprises a hollow box-like structure provided with parallelly spaced side walls 12 and 13 which extend substantially at right angles to the beam 9. The frame 11 is provided with three horizontal bores 14, 15 and 16 which extend through the sides 12 and 13 at right angles thereto. The said bores are located in said frame in spaced parallel relation and are adapted to receive the pipes 17, 18, and 19 which are mounted therein as hereinafter set forth. Each of the pipes 17, 18 and 19 is provided adjacent its free end with a helically disposed flange 20 and each of the bores in the side 12 of the frame 11 is provided with a helically disposed groove adapted to receive the helically disposed flange 20. As shown in the drawings, the pipe 19 is mounted in the bore 14, the pipe 18 in the bore 15 and the pipe 17 in the bore 16. The bores 14, 15 and 16 in the wall 13 are smooth and each bore in said wall 13 is adapted to permit a rotatory and longitudinal movement of the pipe passing therethrough. The pipe 19 is connected to a train pipe 21 by the flexible hose 22 which is substantially secured to the inwardly extending end thereof. The pipe 18 is similarly secured to the hose 23 and the pipe 17 to the hose 24 which are each attached to a train pipe (not shown) as illustrated in Figure 4. The free end of each pipe 17, 18 and 19 is provided with a locking head which comprises an outwardly projecting circumferentially extending flange 25. The flange 25 is provided with an extended portion which constitutes a locking lip 26 and is also provided with an extended portion 27 which is oppositely disposed from the lip 26, and terminates in a locking hook 28. The hook 28 is formed by carrying the extended portion 27 of the said flange 25 outwardly then inwardly parallel to the face of the flange 27. The forward face of the lip 26 is disposed at a right angle to a line drawn through the center of the pipe. The other side of the lip being formed so that its surface is oblique to the inward face thereof, thus providing a thin edge 29 and a relatively thick edge 30. Each of the pipes 17, 18 and 19 are provided with a collar 31 which is suitably secured thereto as by the set screw 32. A spring preferably of spiral form is mounted on each of the pipes 17, 18 and 19 so that one end of the spring 33 is in contact with the wall 13 and the other end is positioned against the collar 31. The spring 33 is arranged to normally force the collar 31 outwardly against the wall 12 and thus force the free ends of the pipes 17, 18 and 19 outwardly past the face of the coupling 10. The collar 31 is provided with a lug 35 which is adapted to strike the lug 34 which extends inwardly from the inner face of the wall 12 when the pipes are in a normal or uncoupled relation. The collar is arranged on each pipe relative to the lug 34 so that the lip 25 and the hook 28 will occupy a position to one side of a line running vertically across the center of the pipe when the pipes are in an uncoupled position.

The inner wall of each of the pipes 17, 18 and 19 is cut away adjacent the abutting face thereof to provide a seat 43 for the resilient packing washer 36 which extends slightly beyond the face of the flange 25.

Figure 6:
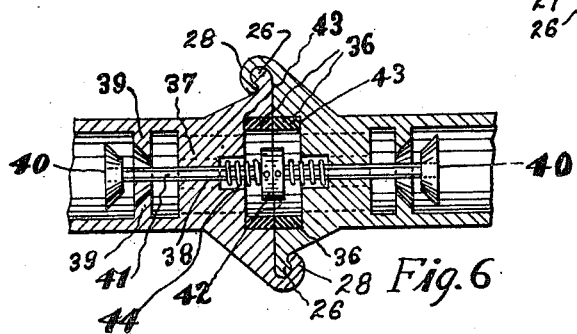
Figure 6 is a longitudinal sectional view of two steam pipes coupled in accordance with this invention and illustrating particularly the automatic means provided for opening and closing the ends of each pipe.

Ordinarily, the upper pipe 19 and the lower pipe 17 are used to carry air and the pipe 18 is used to carry steam, while each of the pipes 17, 18 and 19 may be equipped with the valve shown in Figure 6. I prefer to construct only the steam line 18 as herein shown. Extending transversely across the bore of the pipe 18 at a point inwardly from and approximately flush with the seat 43 of the locking head is a supporting web or bar 37 which is provided with a bore 38 which is disposed therethrough in line with the center of the pipe. The pipe 18 is also provided at a point inwardly from the bar 37 with an inwardly extending annular flange 39. The inner face of the flange 39 is inclined at an angle to the wall of the bore in said pipe so as to provide a seat for the valve head 40 which is mounted in the stem 41 which extends longitudinally through the bore 37 and normally projects beyond the face of the flange 25. The projecting end of the stem 41 is provided with a collar 42 which is suitably secured thereto on the outwardly extending end thereof. A coil spring 44 is mounted on the stem 41 so as to be compressed between the web 37 and the collar 42. The spring 44 is arranged to normally force the stem 41 to an outward position and seat the valve head 40 against the face of the flange 39.

It will be noted that when two cars are coupled the ends of each pipe will be brought in abutment with the corresponding pipe on the car which is coupled thereto. As the pipes extend beyond the coupler 10, each pipe will be forced to move longitudinally in the bore in which it is mounted. The helically disposed flange 20 on each pipe being seated in the helical groove in the wall of said bore will cause a clockwise rotary movement of each pipe on each car as the cars are brought together. As the pipes are thus rotated, the thin edge of the lip 26 on the locking head of each pipe will enter the hook 28 on the abutting locking head so that when the cars are completely coupled the lip 26 will be entirely within the hook portion 28 of the abutting pipe and because of its wedge-like shape, the resilient packing washers 36 will be compressed thus forming an air tight juncture.

The collars 42 on the stems 38 will be forced together as the cars are coupled, thus opening the valves 40 and permitting air, steam or other liquid to freely pass from one pipe to another.

Having thus described my invention what I claim as new and desire to secure by Letters Patent is:—

In combination with a car coupler, pipe supporting means attached to the underside thereof, said means comprising a box-like casing provided with spaced vertical parallel walls disposed at a right angle to said coupler, a horizontal bore extending through said walls, a pipe suitably mounted in said bore, the wall of the bore in the forward wall provided with a helically disposed groove, the pipe provided with a helically disposed flange adapted to fit in said groove, a collar positioned on said pipe between said walls, a spring mounted on said pipe between said collar and the rear wall of said casing, said spring adapted to normally hold said pipe in said bore with its outwardly extending end projecting beyond said coupler so that the same will be moved longitudinally in said bore upon being brought into contact with a like pipe similarly mounted, said pipe provided on its outwardly extending end with means to lock it to said like pipe when the said pipes are given a rotary movement by being forced longitudinally in said bore, a normally closed valve within said head and means adapted to automatically open said valve when the pipe is coupled to a like pipe.

In testimony whereof I have hereunto set my hand.

THEOPHILUS T. BURCHELL.